(12) United States Patent
Lopes et al.

(10) Patent No.: US 10,573,100 B2
(45) Date of Patent: Feb. 25, 2020

(54) NUT, IN PARTICULAR WHEEL OR AXLE NUT, WASHER, CONTROL DEVICE FOR WHEEL OR AXLE NUTS IN VEHICLES AND VEHICLE PROVIDED THEREWITH

(71) Applicant: Maxion Wheels Germany Holding GmbH, Königswinter (DE)

(72) Inventors: Carlos Eduardo Lopes, Sao Paulo (BR); Paulo Eduardo Barreto Paraizo, Tallmadge, OH (US)

(73) Assignee: Maxion Wheels Germany Holding GmbH, Königswinter (DE)

(*) Notice: Subject to any disclaimer, the term of this patent is extended or adjusted under 35 U.S.C. 154(b) by 0 days.

(21) Appl. No.: 15/985,914

(22) Filed: May 22, 2018

(65) Prior Publication Data

US 2019/0139336 A1 May 9, 2019

Related U.S. Application Data

(63) Continuation of application No. 15/510,242, filed as application No. PCT/IB2015/057166 on Sep. 17, 2015, now Pat. No. 9,978,190.

(30) Foreign Application Priority Data

Sep. 18, 2014 (DE) .................... 20 2014 104 451 U

(51) Int. Cl.
*B60Q 1/00* (2006.01)
*G07C 5/08* (2006.01)
(Continued)

(52) U.S. Cl.
CPC .............. *G07C 5/0816* (2013.01); *B60B 3/14* (2013.01); *B60B 3/142* (2013.01); *B60B 3/145* (2013.01);
(Continued)

(58) Field of Classification Search
None
See application file for complete search history.

(56) References Cited

U.S. PATENT DOCUMENTS

| | | |
|---|---|---|
| 5,871,402 A | 2/1999 | Bächle |
| 6,213,885 B1 | 4/2001 | Bächle |
| (Continued) | | |

FOREIGN PATENT DOCUMENTS

| | | |
|---|---|---|
| CN | 1156645 A | 8/1997 |
| DE | 3333285 A1 | 4/1985 |
| (Continued) | | |

OTHER PUBLICATIONS

German Search Report. Application No. DE202014104451.5 dated Jun. 22, 2015.

(Continued)

*Primary Examiner* — Adolf Dsouza
(74) *Attorney, Agent, or Firm* — MacMillan, Sobanski & Todd, LLC

(57) ABSTRACT

A wheel nut or axle nut for vehicles, having a body, having a central threaded hole, having a peripheral wall, and having an abutment face at a lower side The nut also has a plurality of wrench faces on the peripheral wall of the nut body for tightening or releasing the nut by a tool which cooperates with the wrench faces. In the body at least one recess is provided in which a sensor element is arranged The sensor element is connected to a wireless interface which is configured to transmit a sensor signal of the sensor element wirelessly to an external reception unit.

20 Claims, 5 Drawing Sheets

(51) Int. Cl.
*G01L 5/24* (2006.01)
*B60B 3/16* (2006.01)
*F16B 31/02* (2006.01)
*G01L 5/00* (2006.01)
*B60B 3/14* (2006.01)
*B60B 27/00* (2006.01)
*B60B 27/06* (2006.01)

(52) U.S. Cl.
CPC ............ *B60B 3/16* (2013.01); *B60B 27/0068* (2013.01); *B60B 27/065* (2013.01); *F16B 31/02* (2013.01); *F16B 31/028* (2013.01); *G01L 5/0047* (2013.01); *G01L 5/24* (2013.01); *B60B 2310/318* (2013.01); *F16B 2031/022* (2013.01)

(56) References Cited

U.S. PATENT DOCUMENTS

| | | | |
|---|---|---|---|
| 6,250,863 | B1 | 6/2001 | Kamentser et al. |
| 7,350,420 | B2* | 4/2008 | Burnnann ............... G01L 5/246 73/761 |
| 8,156,820 | B2 | 4/2012 | Dral et al. |
| 2001/0037576 | A1* | 11/2001 | Dirks ..................... A01D 34/90 30/276 |
| 2006/0225511 | A1 | 10/2006 | Burmann |
| 2007/0211973 | A1* | 9/2007 | Rode ..................... B25B 27/062 384/448 |
| 2008/0094191 | A1 | 4/2008 | Grickscheit et al. |
| 2009/0151466 | A1* | 6/2009 | Wu ....................... F16B 31/025 73/761 |
| 2010/0054891 | A1 | 3/2010 | Nashida et al. |
| 2010/0116101 | A1 | 5/2010 | Dral et al. |
| 2015/0211718 | A1* | 7/2015 | Dieknnann ............ H05K 1/118 362/382 |

FOREIGN PATENT DOCUMENTS

| | | |
|---|---|---|
| DE | 4002259 A1 | 8/1991 |
| DE | 4023747 A1 | 1/1992 |
| DE | 102004043336 A1 | 4/2006 |
| DE | 102004051865 A1 | 11/2006 |
| DE | 102009043267 A1 | 4/2011 |
| EP | 1642106 B1 | 12/2007 |
| GB | 2463081 A | 3/2010 |
| JP | S59145934 U | 9/1984 |
| JP | H0456698 B2 | 9/1992 |
| JP | H0610937 A | 1/1994 |
| JP | 2010053927 A | 3/2010 |
| JP | 2010513866 A | 4/2010 |
| WO | 2008/072957 A1 | 6/2008 |
| WO | 2011/020454 A1 | 2/2011 |

OTHER PUBLICATIONS

PCT International Search Report and the Written Opinion, Application No. PCT/IB2015/057166 filed Sep. 17, 2015, dated Dec. 22, 2015.
PCT International Preliminary Report on Patentability, Application No. PCT/IB2015/057166 filed Sep. 17, 2015, dated Mar. 21, 2017.
Chinese Second Office Action, Application No. 201580050708.0, dated May 13, 2019.
Japanese Search Report, Application No. JP 2017-508681, dated Jul. 9, 2019.

* cited by examiner

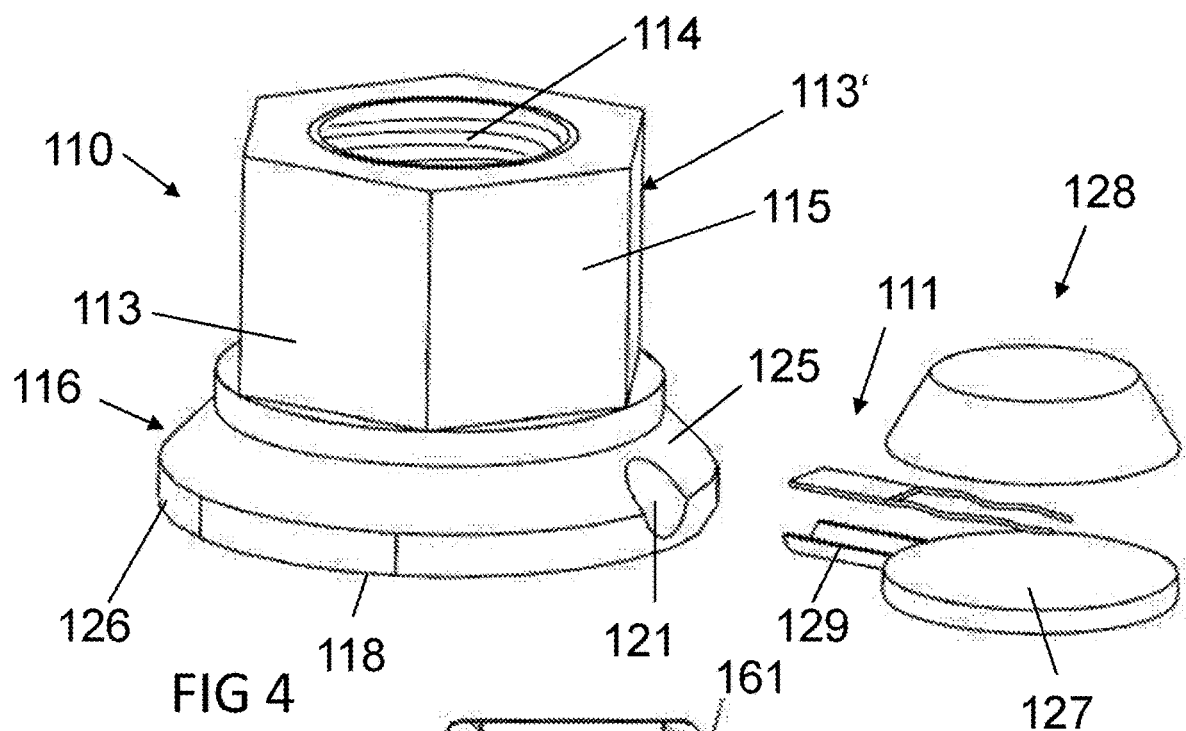
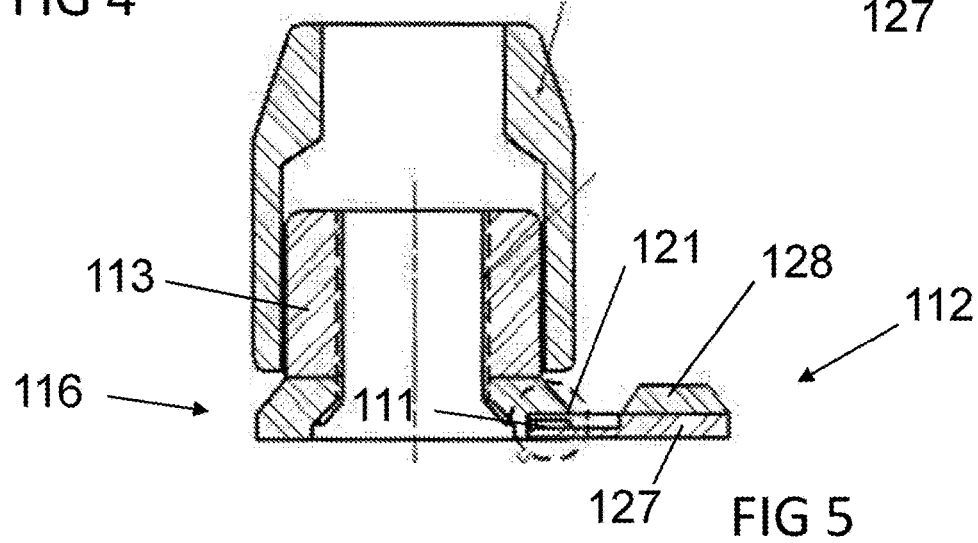
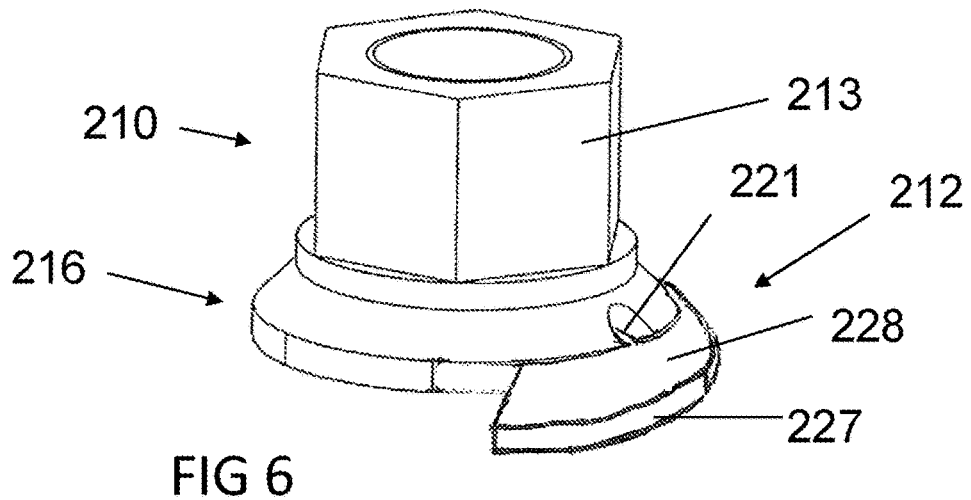

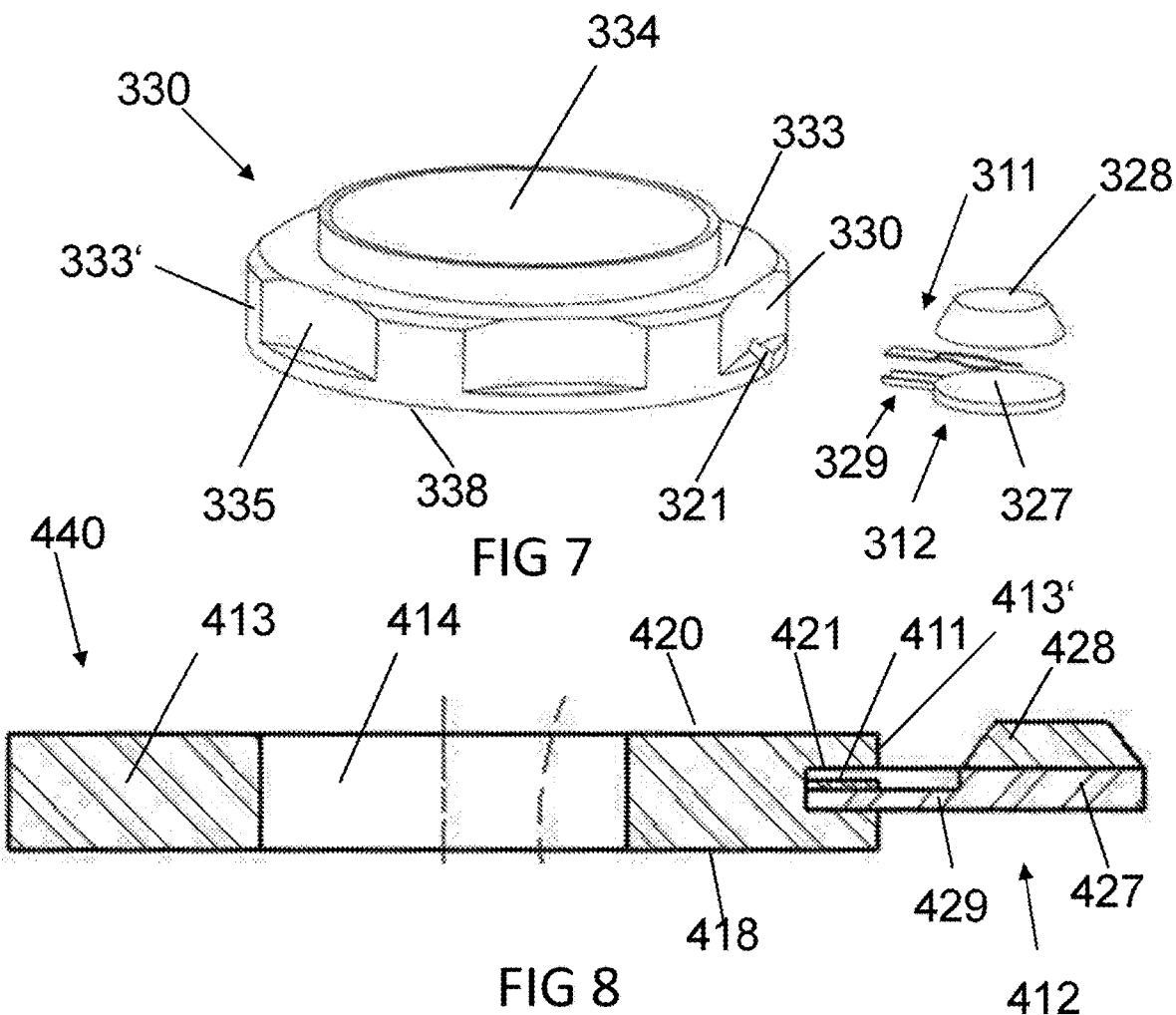
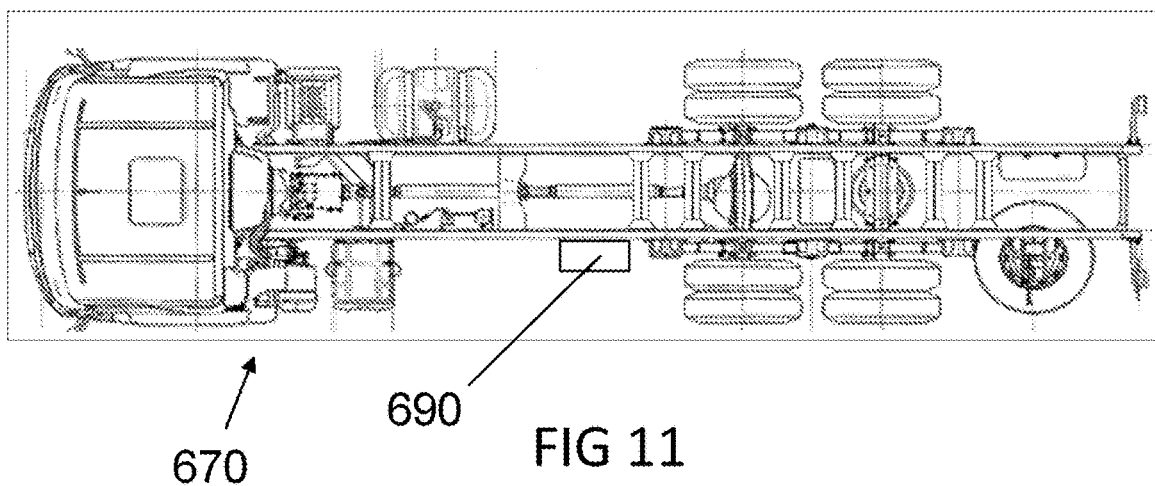

NUT, IN PARTICULAR WHEEL OR AXLE NUT, WASHER, CONTROL DEVICE FOR WHEEL OR AXLE NUTS IN VEHICLES AND VEHICLE PROVIDED THEREWITH

CROSS-REFERENCE TO RELATED APPLICATIONS

This application is a continuation of U.S. Ser. No. 15/510,242, filed 10 Mar. 2017, now U.S. Pat. No. 9,978,190, issued on 22 May 2018, the disclosures of which are incorporated herein by reference in entirety, which is a national stage of International Application No. PCT/IB2015/057166, filed 17 Sep. 2015, the disclosures of which are incorporated herein by reference in entirety, and which claimed priority to German Patent Application No. 20 2014 104 451.5 filed 18 Sep. 2014, the disclosures of which are incorporated herein by reference in entirety.

BACKGROUND OF THE INVENTION

The invention relates to a nut for fixing releasable components, such as machine elements, which are subjected during operational use to an increased risk of the fixed and reliable arrangement becoming loose, for example, as a result of vibrations. The particularly preferred field of application of the invention relates to wheel nuts or axle nuts for vehicles. Nuts of the generic type are provided with a nut body, a central threaded hole, a peripheral wall, an abutment face at a lower side of the nut and a plurality of wrench faces on the peripheral wall of the nut body for tightening or releasing the nut by means of a tool which cooperates with the wrench faces. The invention also relates to washers for use with corresponding nuts, in particular with wheel nuts or axle nuts for vehicles, having a disc body, a central hole, a peripheral wall, an abutment face on a lower side of the disc body and an abutment face on an upper side of the disc body. With regard to the main application field of the invention, that is to say, the securing of vehicle wheels or wheel bearings on the axles of vehicles, the invention also relates to a control device for wheel or axle nuts in vehicles which have at least one wheel bearing which is fixed to a vehicle axle by means of an axle nut and/or at least one vehicle wheel which is fixed to a wheel hub by means of a wheel nut and which are provided with an on-board electronic unit, via which information from sensor elements can be displayed for the vehicle driver, wherein the wheel nut and/or the axle nut are provided with a nut body, a central threaded hole, a peripheral wall, an abutment face at a lower side of the nut and a plurality of wrench faces on the peripheral wall of the nut body for tightening or releasing the nut by means of a tool which cooperates with the wrench faces, and further also vehicles provided with such a control device.

In road traffic, accidents may occur as a result of a large number of different causes, it being possible for particularly a technical failure on the vehicle or vehicle components also to constitute such a cause in addition to human error. In commercial vehicles but also in private cars, the fixed arrangement of the wheel nuts with which a vehicle wheel is fixed to a wheel hub is checked only rarely. Not only after a wheel has been changed but also as a result of the daily operational use of the vehicle on the road, individual wheel nuts may become loose, which may already lead to extreme situations when travelling round bends, such as a loss of control over the vehicle or even damage to the tyres or a vehicle wheel becoming loose. The axle nuts with which a wheel bearing which generally comprises the wheel hub and the brake disc is secured to the axle of a vehicle can also become loose or may be mounted incorrectly after, for example, a brake disc has been changed.

For commercial vehicles such as buses, lorries, refuse vehicles, vehicles for transporting hazardous goods and utility vehicles, there are often used wheel nut indicators which are available in extremely varied wrench widths and which are constructed depending on the configuration either as a ring with a marking arrow or as a cap with a marking arrow, and are fixed after a wheel change to the wheel nut which was preferably tightened with a predetermined torque. The greatest level of safety for the vehicle driver is then ensured if each wheel nut on each vehicle wheel is provided with a corresponding indicator, wherein two adjacent wheel nuts generally form a pair, in which the indicators are mounted in such a manner that the arrow tips are directed towards each other. It is then possible for the vehicle driver to check for a wheel nut becoming loose by means of a visual inspection of all the vehicle wheels. If, however, there are used wheel caps which cover the wheel nuts, it is not possible to use corresponding indicators in an advantageous manner. There is further the risk that the indicators become stolen or become loose. By suitable plastics materials being selected, an excessively powerful generation of heat in brakes can also be signalled with the indicators, that is to say, if the melting point is so low that the indicators become deformed or melt.

DE 20 2004 051 865 B4 discloses an electronic wheel securing system for wheel nuts. Each individual wheel bolt is provided with an insulated contact pin whose free pin end protrudes beyond the upper side of the wheel bolt. The outer thread portions of the individual wheel bolts are partially insulated and all the wheel bolts are connected to each other via contact rails in such a manner that a wheel nut which is screwed onto the wheel bolt engages in the region of the fixing location thereof through an insulation of the contact pin and thereby closes a circuit between the wheel bolt and contact rail. If the wheel nuts become loose by a necessary minimum dimension of at least one thread turn, the contact is interrupted, whereby there is produced an electrical impulse which is indicated acoustically and/or optically as a warning signal for the vehicle driver. Such a system is very passive and reacts only when the screw has become loose to such an extent that under some circumstances dangerous situations may already occur. It is further disadvantageous for the contact rail to have to be acted on permanently with electric current.

BRIEF SUMMARY OF THE INVENTION

A feature of the invention is to be able to detect the loosening of nuts within screw fixings, such as particularly in wheel nuts or axle nuts of vehicles, and to be able to indicate them to a vehicle driver in such a manner that dangerous situations are avoided from the outset.

In order to achieve this feature, it is proposed with the invention that the nut be provided with at least one recess, in which a sensor element is arranged, wherein the sensor element is connected to a wireless interface which is configured to transmit a sensor signal of the sensor element wirelessly to an external reception unit. As a result of the integration of a sensor element in the nut, not only in wheel nuts but, for example, also in axle nuts, but also in nuts for securing, for example, rotating machine components, such as saw blades, or machine components which are subjected to powerful vibrations, a change of state, for example, of the inner stress in the nut can be detected in order then to produce a warning signal where applicable as a result of the sensor signal which is initiated by the change of state that the nut, such as, for example, a wheel nut or axle nut, has become loose.

In a screw connection having a washer, it is also possible in order to achieve the above object to provide a recess in the disc body of the washer, wherein a sensor element is arranged in the recess and the sensor element is connected to a wireless interface which is configured to transmit a sensor signal of the sensor element wirelessly to an external reception unit. Consequently, it is not absolutely necessary to establish the change of state directly at the nut (wheel nut, axle nut, fixing nut) if there is used in the screw connection a washer which is clamped by means of the nut between a vehicle-side (machine-side) clamping face and the abutment face of the nut and which is acted on with the forces which are produced when the nut is tightened.

In a particularly preferred embodiment, the sensor element is arranged in the recess together with a casting compound or an adhesive. It is particularly advantageous if the casting compound or the adhesive completely fills the recess around the sensor element.

The wireless interface preferably has a transmission unit which is connected to the sensor element.

According to an embodiment, the nut may be provided, preferably integrally, with a pressure plate which projects with the plate edge thereof beyond the wrench faces and which forms the abutment face with the lower side thereof. Corresponding nuts having a non-releasably integrated pressure plate are often provided in wheel nuts for commercial vehicles. In this embodiment, the recess may then also be formed in the plate edge of the pressure plate. The plate periphery of the plate edge may preferably have a cylindrical portion and a conical portion. The arrangement can be produced in such a manner that the recess is formed only in the region of the cylindrical portion, or the recess is formed both in the cylindrical portion and in the conical portion.

According to a construction variant, the recess may be formed partially or completely in the peripheral wall in the case of the nut or the washer or the pressure plate. In a nut having a pressure plate or in the washer, the recess may also be formed as a partial recess preferably in the upper side of the pressure plate or the washer, wherein the recess then preferably has a passage to the peripheral wall. There may also be provided a plurality of recesses or indentations which are connected to each other.

According to a variant, the transmission unit may be arranged outside the recess and electrically connected to the sensor element via a printed-circuit board or wiring. In this embodiment, it may be advantageous for the printed-circuit board to extend as a base plate as far as a location inside the recess or for there to be provided under the transmission unit a support plate which extends as far as a location inside the recess. The printed-circuit board may in this instance preferably be constructed as a circular or ring-segment-like base plate.

According to an alternative variant, the transmission unit may be arranged within the recess together with the sensor element, where applicable also together with a battery for electrical supply. In particular in this construction, an antenna could be arranged outside the recess in order to ensure the wireless signal transmission.

According to an advantageous embodiment, the sensor element may be a pressure sensor or force sensor with which the pressure and/or torsion stresses which are produced in the body of the nut, the pressure plate or the washer when the nut or a screw connection which has the washer is tightened can be detected; where applicable, in particular the forces which are produced in the recess during tightening and which act on the adhesive or the casting compound may then be detectable or be detected with this sensor.

According to another construction variant, the sensor element may be a position sensor, with which relative displacements of the sensor element can be detected relative to a reference position.

The above-mentioned feature is also achieved by a control device for wheel or axle nuts in vehicles which are provided with an on-board electronic system, via which information from sensor elements can be displayed for the vehicle driver by the wheel nut and/or the axle nut or a washer cooperating therewith having at least one recess in the peripheral wall in which a sensor element is arranged, wherein the sensor element is connected to a wireless interface which is configured to transmit a sensor signal of the sensor element wirelessly to an external reception unit which is connected to the on-board electronic system. The nut or the washer is then preferably constructed as described above.

The invention is preferably used, as described, in a vehicle, in particular in a commercial vehicle, having a plurality of vehicle axles, to which a wheel bearing which comprises at least one wheel hub is fixed by means of an axle nut, having at least one vehicle wheel which is fixed to each wheel hub by means of a plurality of wheel nuts and having an on-board electronic system, via which information from sensor elements can be displayed for the vehicle driver, wherein the wheel nut and/or the axle nut are provided with a nut body, a central threaded hole, a peripheral wall, an abutment face at a lower side of the nut and a plurality of wrench faces on the peripheral wall of the nut body for tightening or releasing the nut by means of a tool which cooperates with the wrench faces, and having a control device for controlling the arrangement state of the wheel nut or axle nut, wherein at least one wheel nut or axle nut or washer is formed as described above, and at least one reception unit which is connected to the on-board electronic system is provided to transmit the sensor signals of the wheel or axle nut or washer to the on-board electronic system. According to the preferred embodiment, a central reception unit for receiving the sensor signals of all the nuts which are provided with a sensor element is provided in the vehicle.

Other advantages of this invention will become apparent to those skilled in the art from the following detailed description of the preferred embodiments, when read in light of the accompanying drawings.

BRIEF DESCRIPTION OF THE DRAWINGS

FIG. 4 is a schematic perspective view, in a highly simplified manner, of a nut according to the invention, in particular a wheel nut, according to a second embodiment;

FIG. 5 is a cross-section of the wheel nut from FIG. 4 together with a tool fitted thereon;

FIG. 6 is a schematic perspective view, in a highly simplified manner, of a nut according to a third embodiment;

FIG. 7 is a schematic perspective exploded view, in a highly simplified manner, of a nut, in particular a hub nut;

FIG. 8 is a cross-section through a washer according to the invention;

FIG. 11 shows the preferred field of application of the invention as a schematic plan view of a commercial vehicle.

DETAILED DESCRIPTION OF THE INVENTION

Figure 1:
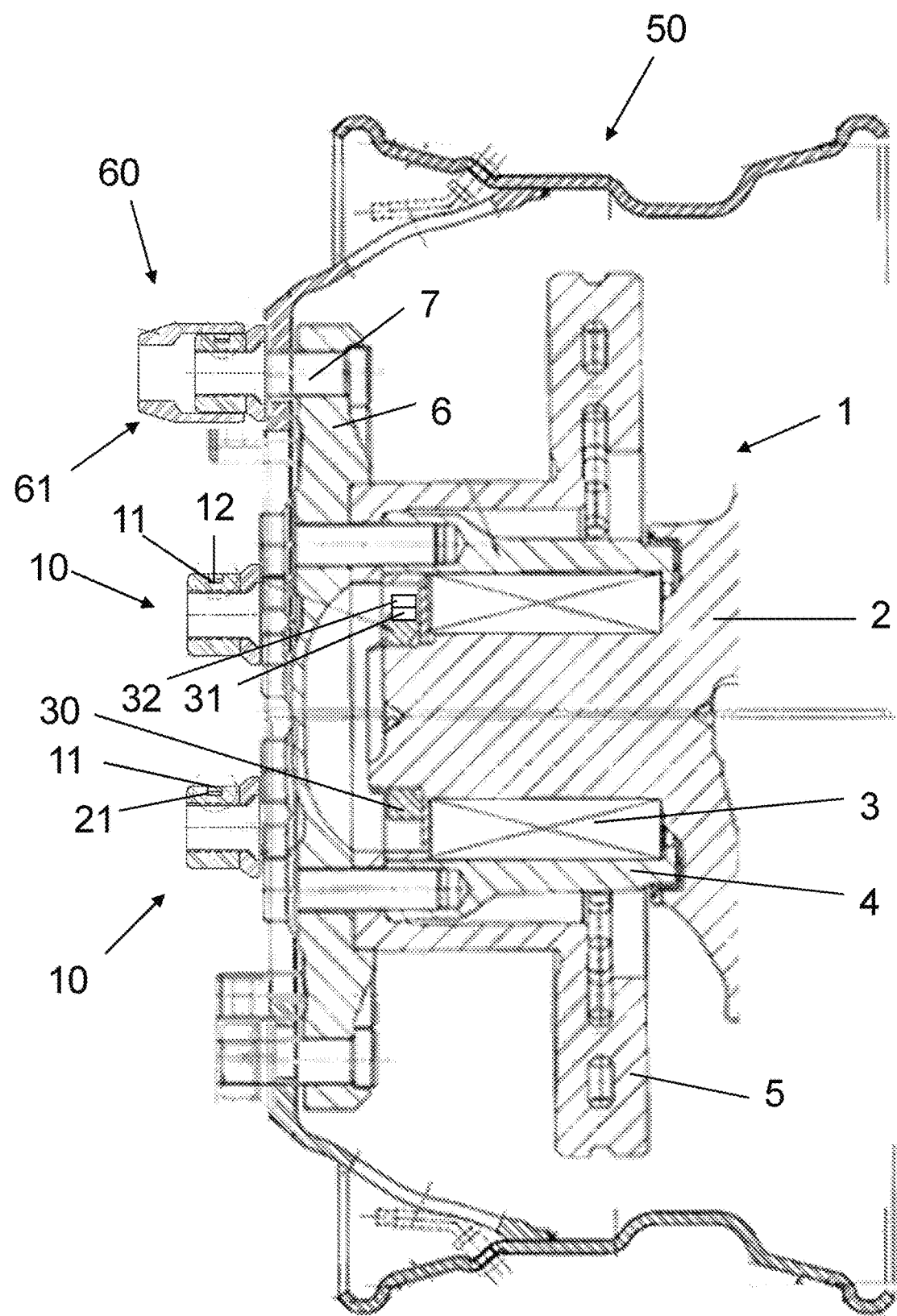
FIG. 1 is a schematic cross-section of a wheel bearing which is fixed by means of an axle nut according to the invention and a vehicle wheel which is fixed to the hub by means of wheel nuts according to the invention.

FIG. 1 is a schematic highly simplified view of a wheel bearing which is generally designated 1 at the axle end 2 of a vehicle which is not illustrated in greater detail, such as, for example, a commercial vehicle. The wheel bearing 1 comprises in a manner known per se a bearing drum 4 which is fixed at the axle end 2 by means of a suitable roller bearing and to which a brake disc 5 and a wheel hub 6 which is provided with projecting wheel bolts 7 for fixing a vehicle wheel 50 are fixed in a rotationally secure manner. The entire wheel bearing 1 is secured at the axle end 2 of the axle by means of an axle nut 20.

The vehicle wheel 50 is again secured to the wheel hub 6 by means of a number of wheel nuts 10 corresponding to the number of wheel bolts 7, wherein the individual wheel nuts 10 are generally secured to the wheel hub 6 of the wheel bearing 1 by means of a tool 60 which is indicated with the tool head 61 thereof with a predetermined tightening torque. In FIG. 1, all the wheel nuts 10 illustrated are provided with a sensor element 11, respectively, with which, as will be explained below, the secure arrangement, in particular the stress state of the wheel nut 10 on the wheel bolt 7, can be monitored, wherein the sensor element is connected to a wireless interface 12, by means of which the sensor signal of the sensor element 11 can be wirelessly transmitted to an external reception unit which is not illustrated in greater detail. In the embodiment illustrated according to FIG. 1, the axle nut 30 is further also provided with a sensor element 31 and a wireless interface 32 which is connected thereto in order to transmit the sensor signal which is detected by the sensor element 31 with respect to the secure arrangement of the axle nut 30 to preferably the same external reception unit which is not shown. The shown structure of the wheel bearing 1 and the construction of the vehicle wheel 50 is only exemplary and freely selectable and serves only to explain the preferred application field of the invention.

Figure 2:
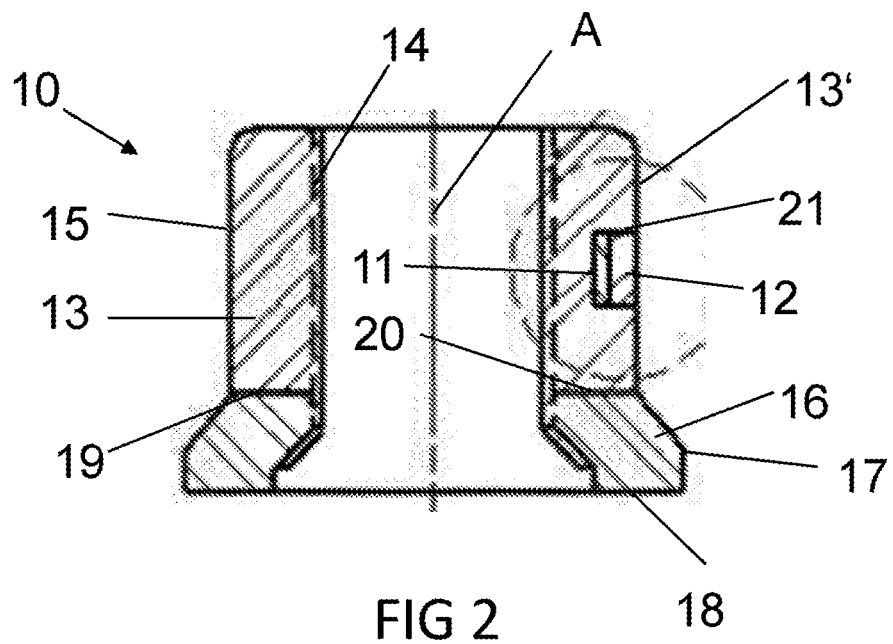
FIG. 2 is a detailed view of the wheel nuts used in FIG. 1.

FIG. 2 is a cross-section, drawn to an enlarged scale, of the wheel nut 10 from FIG. 1. The wheel nut 10 is constructed as a hexagonal flanged nut in a construction type known per se and has a nut body 13 which is provided with a central threaded hole 14 and, at the periphery thereof, with six wrench faces 15 which are located so as to be offset relative to each other. In the example shown, there is arranged at the lower side of the nut body 13 a movable pressure plate 16 which is retained in a non-releasable manner on the nut body 15 but which can rotate relative to the nut body about the hole axis A of the wheel nut 10. The pressure plate 16 forms, in the fixed state in the direction towards the wheel disc of a vehicle wheel, a collar 17 which widens in an outward direction and which forms with the lower side 18 thereof an abutment face at the outer face of the wheel disc of the vehicle wheel which is fixed with the wheel nut 10, as shown in FIG. 1, to a hub and cooperates therewith. The lower side 19 of the actual nut body 13 and the upper side 20 of the pressure plate 16 form friction faces, substantially only the nut body 13 generally being rotated when the wheel nut is tightened, preferably by means of a torque wrench, in order to comply with the tightening torque, whereas the pressure plate 16 remains fixed in position to the greatest possible extent.

Figure 3:
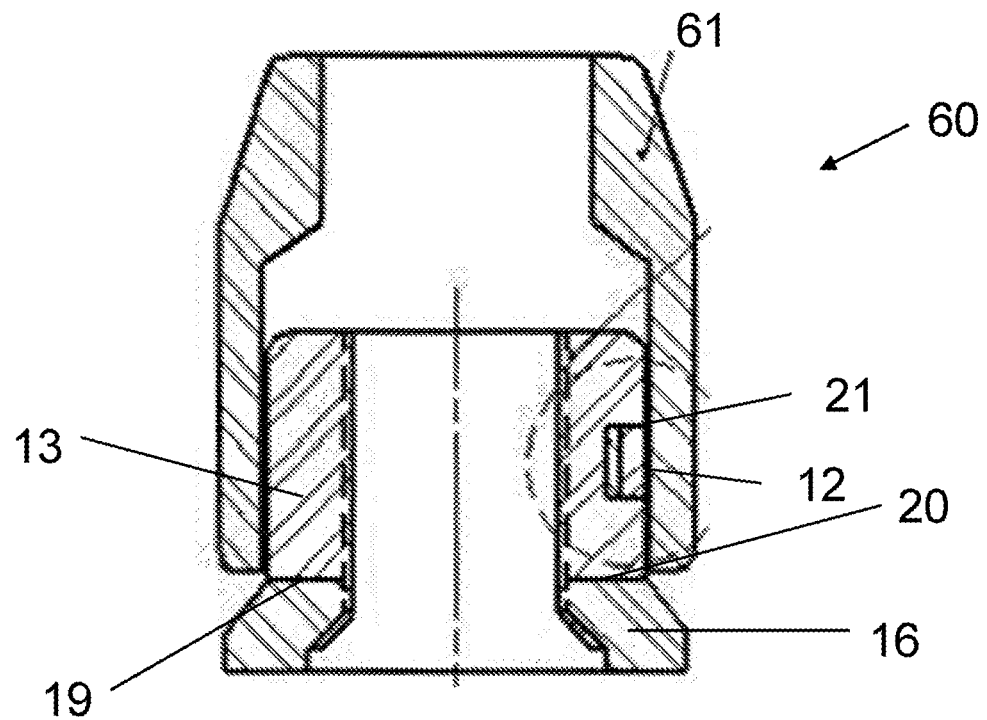
FIG. 3 shows a wheel nut according to the invention with a tool placed thereon.

According to the invention, there is formed here in the peripheral wall 13' of the nut body 13, preferably centrally with respect to one of the wrench faces 15, a recess 21 in which there are arranged both a sensor element 11 and a wireless interface 12 which is constructed in a correspondingly miniaturised manner and which has an integrated transmission unit, which are connected to the sensor element 11 in such a manner that a sensor signal of the sensor element 11 can be transmitted wirelessly. The sensor element 11 and the interface 12 are arranged completely inside the recess 21 without projecting, wherein the recess 21 is further filled with a suitable adhesive or a suitable casting compound which protect the elements (sensor element 11, interface 12) which are arranged inside the recess 21, in particular also with respect to environmental influences and at the same time retain the sensor element 11 and the interface 12 securely in the recess 21. When the nut 10 is tightened by means of the tool head 61 of the tool 60, as illustrated in an enlarged manner in FIG. 3, which tool 60 preferably comprises a torque wrench, with which the torque for the wheel nut can be determined, inner stresses in the form of pressure stresses and/or torsion stresses which can be detected by means of the sensor element 11 are produced in the pressure plate 16 and, as a result of the common contact faces between the upper side 20 of the pressure plate 16 and the lower side 19 of the nut body 13, also in the nut body 13. To this end, the sensor element 11 can, for example, comprise a pressure sensor such as a miniaturised DMS sensor or a piezoelectric sensor which produces, for a specific stress state in accordance with the torque of the wheel nut, a sensor signal corresponding to that torque. By means of the wireless interface 12 which acts as a transmission unit, that sensor signal can then transmit wirelessly to a reception unit and subsequently be evaluated with an on-board electronic system of a vehicle. If the wheel nut 10 becomes loose, the inner stress state in the nut body 13 changes accordingly, as does the sensor signal as a result; either the respective sensor signal can be evaluated and displayed constantly by means of the on-board electronic system, or a warning signal for the vehicle driver is triggered only when a value falls below a specific signal value of the sensor signal in order to notify the driver of a defective fixing of at least one of the wheel nuts. The sensor element 11 and the interface 12 are completely integrated in the recess 21 and do not project beyond the peripheral wall 13' so that the tool head 61 can still be inverted over the nut body 13 of the hexagon flanged nut with the wrench counterfaces.

FIGS. 4 and 5 show a second embodiment of a nut 110, which is again preferably a wheel nut for fixing a vehicle wheel to the wheel hub of a wheel bearing. The nut 110 is also in the form of a hexagon flanged nut having a nut body 113 which has at the peripheral wall 113' thereof the six wrench faces 115 and which is provided centrally with a threaded hole 114, via which the wheel nut 110 can be screwed on a wheel bolt. As in the preceding embodiment, the wheel nut 110 is provided with a pressure plate 116 which forms a collar which widens outwards and which merges via a conical transition portion 125 into a cylindrical portion 126 whose lower side 118 forms the contact face with the wheel disc of the vehicle wheel. As may be clearly seen in particular in FIG. 5, although the pressure plate 116 is also secured to the nut body 113 in a non-releasable manner here, it can be rotated relative thereto and the securing of the pressure plate 116 to the nut body 113 can be brought about in extremely different manners because it is not an important aspect of the present invention. In the nut 110, the actual nut body 113 is not provided with a recess 121 but instead the pressure plate 116 at the plate edge (plate periphery), in this instance the recess extending partially in the region of the conical portion 115 and partially in the region of the cylindrical portion 126 as a result of the selected dimensions for the cylindrical portion 126 and the conical portion 125. A sensor element 111 is arranged in the recess 121 in such a manner that it is located inside the recess 121 with the sensor face thereof, as FIG. 5 particularly shows. A base plate 127 which at the same time can form at least partially a printed-circuit board and can be connected to a transmission unit 128 is arranged below the sensor element 111, whereby the printed-circuit board 127 and the transmission unit 128 form a wireless interface 112 in order to transmit a sensor signal of the sensor element 111 wirelessly to an external reception unit (not shown). The recess 121 is again preferably filled with adhesive or casting compound in the assembly state of the sensor element 111 with the interface 112, so that the sensor face of the sensor element 111 is protected with respect to environmental influences. In this instance, the forces which are produced when the nut 110 is tightened can be transmitted to the sensor face of the sensor element 111, where applicable also via the adhesive or the casting compound. Since the entire arrangement for the sensor element is located outside the wrench faces 115 in the wheel nut 110, the wheel nut 110 can be tightened by means of the tool head 161, for example, of a torque wrench (not shown) without there being a risk of damaging the sensor element or the transmission unit in the wireless interface 112 when the wheel nut 110 is tightened.

FIG. 6 is a schematic, simplified view of still another embodiment of a wheel nut 210 in a configuration as a hexagon flanged nut. In this instance, the sensor element (not illustrated in detail) and the wireless interface 212 are also not associated with the actual nut body 213 but instead with the pressure plate 216. The wireless interface 212 is arranged on a ring-segment-like base plate 227 which extends at both sides of the recess 221, within which the sensor element is arranged. The segment-like base plate 227 directly adjoins the outer periphery of the cylindrical portion 226 of the pressure plate 216. Such an arrangement affords a closer and simultaneously more reliable arrangement of a transmission unit 228 (only indicated here) on the upper side of the base plate 227.

The application range of the invention is not limited to wheel nuts. FIG. 7 shows an embodiment of an axle nut 330 which serves, for example, to secure a wheel bearing, as already briefly explained with reference to FIG. 1. The axle nut 330 has a nut body 313 having a central threaded hole 314, with which the axle nut 330 can be secured to the axle end. The lower side 339 of the axle nut 330 acts as a contact face with respect, for example, to a support disc for the roller bearing. The peripheral wall 333' of the nut body 330 is provided with six wrench faces 335 again in this instance in order to be able to tighten or loosen the axle nut 310 by means of a suitable tool which cooperates with the wrench faces 335. The nut body 333 is provided with a recess 321 in the peripheral wall 333', in this instance below one of the wrench faces 335, with a sensor element 311 with the sensor face thereof being arranged in this recess 331; the sensor element 311 is preferably connected to a transmission unit 328 as a wireless interface 312 via a printed-circuit board which is integrated in a support plate 327. In the embodiment shown, the base plate 327 and the transmitter 328 have a circular cross-section and in the state for use an adhesive or a casting compound preferably completely fills the recess 331 around the sensor element 311 and a printed-circuit board or supporting plate portion 329 which borders the recess 321.

FIG. 8 shows a washer 440 preferably for use with hexagon nuts as wheel nuts. The washer 440 comprises an annular disc body 413 having a central non-threaded hole 414, the disc body 413 being provided at the peripheral wall 413' thereof with a recess 421, in which there is arranged a sensor element 411 which is connected to a transmission unit 428 via a base plate or printed-circuit board portion 429 and a base plate 427 which acts at the same time as a printed-circuit board in order to form with those elements a wireless interface 412, via which a sensor signal of the sensor element 411 can be transmitted to an external reception unit. The washer 410 has a lower side 418 and an upper side 420, the lower side 418 acting as an abutment face, for example, on a wheel disc and the upper side 420 acting as an abutment face for a nut. Since the washer 410 is arranged within a screw connection between a nut and the stop face (for example, wheel disc), the body 413 of the washer 410 is subjected to the pressure and torsion forces which are applied when the nut of the screw connection is tightened and which can be detected with the sensor element 411 within the recess 421 and which can be used as a reference signal for the secure arrangement of the screw connection or a change of that previously secure arrangement.

Figure 9:
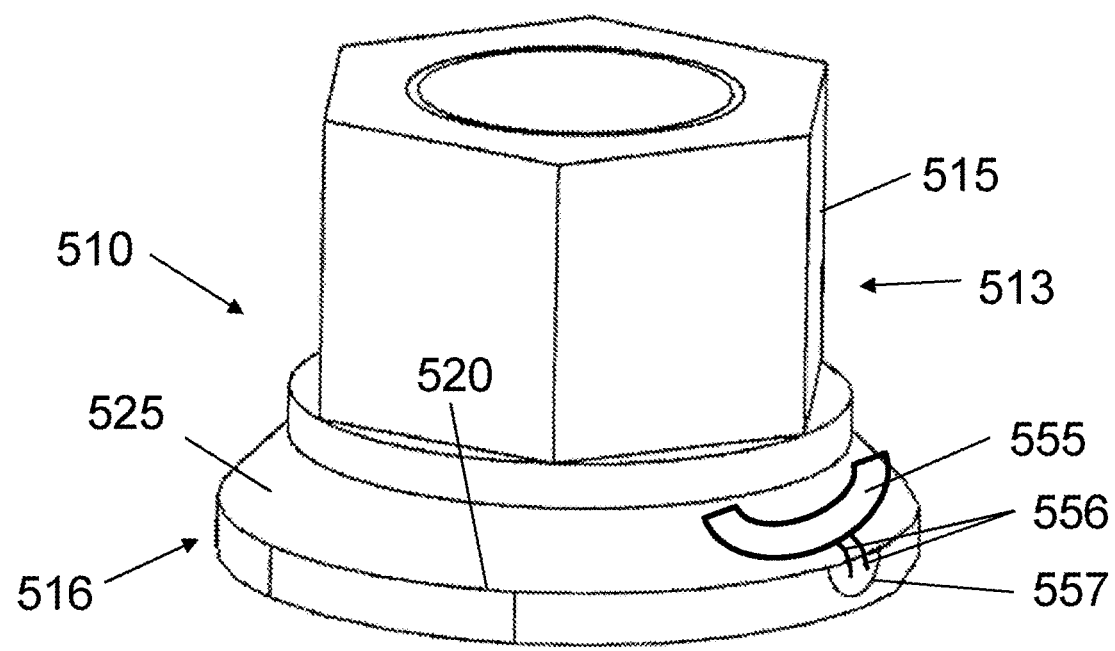
FIG. 9 is a schematic perspective view, in a highly simplified manner, of a nut with a washer or pressure plate according to a fourth embodiment.
Figure 10:
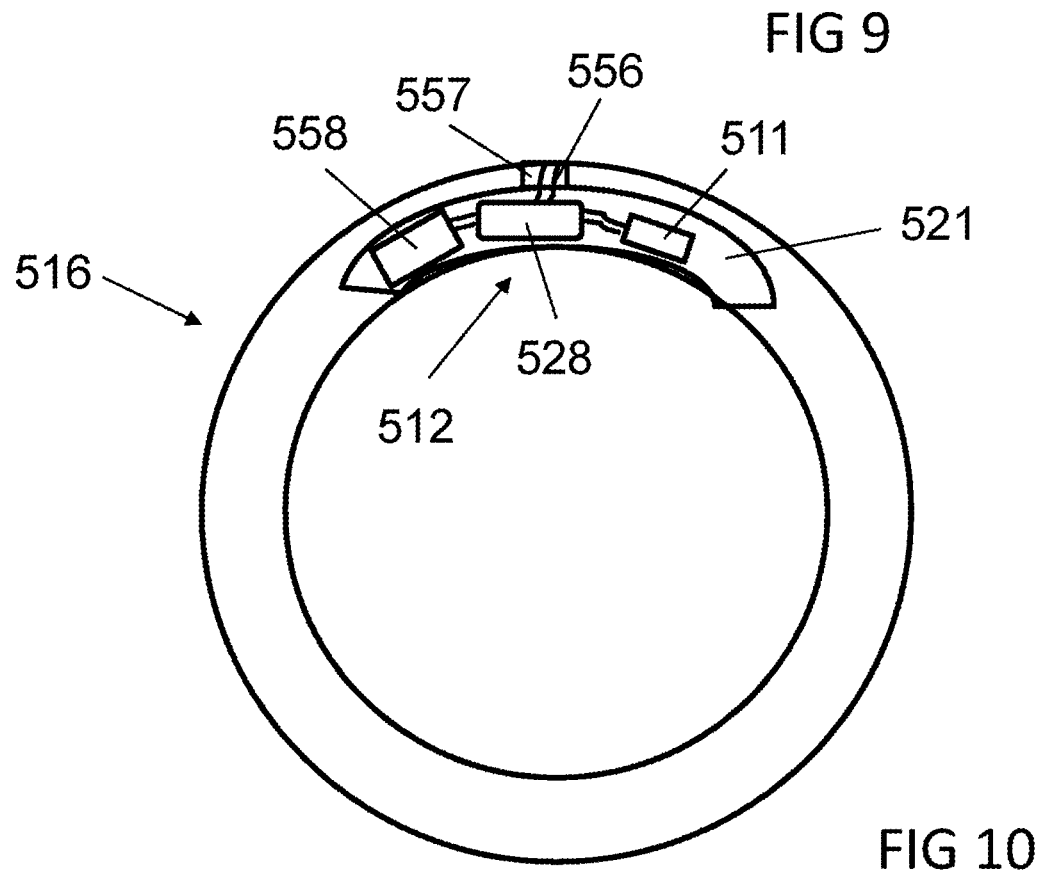
FIG. 10 is a plan view of the pressure plate in the nut according to FIG. 9.

FIGS. 9 and 10 show still another embodiment of a nut 510 having a pressure plate 516. The pressure plate 516 could in this embodiment particularly be in the form of an annular washer or comprise such a washer. There are formed on the nut body 513 the wrench faces 515 with which the nut 510 can be tightened or released by means of a tool. FIG. 9 shows that an antenna 555, which is connected, for example, via cables 556 to a transmission unit 528 (transmitter) which is arranged in a recess 521 in the pressure plate 516, is fitted in the nut 510 at the outer side of the conical portion 525. In this instance, the recess 511 comprises, as can be seen particularly clearly in FIG. 10, a partial recess which is produced mechanically in the upper side 520 of the pressure plate 516 and which is open only via an opening 557 with respect to the peripheral wall of the nut 510 or the pressure plate 516. In this embodiment, the recess 521 may be constructed in different manners and where applicable may also be open with respect to the inner periphery of the pressure plate 516. The recess could also comprise a plurality of smaller recesses which are open towards the upper side. There are also arranged, in addition to the transmission unit 528, in the recess which extends continuously over a part-region of the upper side 520 the sensor element 511 and a battery 558 which are connected to each other or to the transmission unit 528 of the wireless interface 512 via cables or a printed-circuit board, respectively.

The main application field of the invention relates, as already mentioned several times above, to controlling the fixed and reliable arrangement of wheel nuts and/or axle nuts in commercial vehicles. FIG. 11 is a plan view of an example of a commercial vehicle 670 with, in this instance, a front axle (not visible) and two rear axles with a double tyre arrangement. Generally, all the wheel screws are provided, for safeguarding the double tyre arrangement, with a wheel nut which, as described above, is provided with a sensor element and a wireless interface having a transmission unit. Where applicable, each axle nut can also be provided at the respective axle end with a sensor element with a transmission unit. By way of example, the plan view in FIG. 9 shows that a central reception unit 690 is provided in order to detect the individual sensor signals and to forward them to an on-board electronic system (not shown) where it is possible to establish via the individual sensor signals whether the tightening torque of the individual wheel nuts and/or axle nuts is moving within the tolerance range for a secure arrangement or outside this tolerance range.

A large number of modifications which are intended to fall within the scope of protection of the appended claims result from the preceding description for the person skilled in the art. The description of the individual embodiments in the Figures is only exemplary and schematic. The sensor element could also be arranged on nuts which are constructed without a pressure plate or without a collar. The pressure plate could form an integral component of the nut body and then be connected to the nut body in a rotationally secure manner. The axle nut could also have a pressure plate. The embodiment could also be brought about in such a manner that the recess is located within a wrench face or between two wrench faces on a wheel nut or axle nut. The pressure plate could extend only conically or be constructed as a disc-like expansion with only a cylindrical peripheral edge. The shaping in particular of a transmission unit which is arranged outside the recess can be produced practically freely and is not limited to the shaping shown. The sensor element could also comprise a position sensor with which relative displacements of the sensor element can be detected relative to a reference position. In that case, it would not be the forces which are produced as a result of the tightening torque within the nut body and/or the pressure plate, but instead only or where applicable additionally a position displacement which is detected as a sensor signal and transmitted via the transmission unit of the wireless interface to the on-board electronic system. The entire description of the Figures has been set out for wheel nuts, washers and axle nuts for vehicles. However, the invention can generally be used in all nuts for fixing releasable components, such as machine elements, which are subjected to an increased risk of the fixed and reliable arrangement becoming loose during operational use, for example, as a result of vibrations.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. A wheel nut or axle nut for vehicles: having a nut body, having a central threaded hole, having a peripheral wall, having an abutment face at a lower side of the nut, having a plurality of wrench faces on the peripheral wall of the nut body for tightening or releasing the nut by means of a tool which cooperates with the wrench faces, wherein there is arranged at a lower side of the nut body a movable pressure plate which is configured to be retained in a non-releasable manner on the nut body but which is configured to rotate relative to the nut body about an axis of the hole, wherein the pressure plate forms, in a fixed state in a direction towards a wheel disc of a vehicle wheel, a collar which widens in an outward direction and which forms with a lower side thereof an abutment face at an outer face of the wheel disc of the vehicle wheel which is fixed with the wheel nut or axle nut, to a hub and cooperates therewith, wherein the lower side of the nut body and an upper side of the pressure plate form friction faces, substantially only the nut body generally being rotated when the wheel nut or axle nut is tightened, in order to comply with a tightening torque, whereas the pressure plate remains fixed in position, and wherein at least one recess is provided in the pressure plate, in which a sensor element is arranged, wherein the sensor element is connected to wireless interface which is configured to transmit a sensor signal of the sensor element wirelessly to an external reception unit, wherein the wireless interface is arranged on a ring-segment-like base plate which extends at both sides of the recess, within which the sensor element is arranged, and wherein the segment-like base plate directly adjoins an outer periphery of a cylindrical portion of the pressure plate.

2. The wheel nut or axle nut according to claim 1, wherein the sensor element is arranged in the recess together with a casting compound or an adhesive, wherein the casting compound or the adhesive preferably completely fills the recess around the sensor element.

3. The wheel nut or axle nut according to claim 1, wherein the wireless interface has a transmission unit which is connected to the sensor element.

4. The wheel nut or axle nut according to claim 3, wherein the transmission unit is arranged outside the recess and is electrically connected to the sensor element via a printed-circuit board or wiring.

5. The wheel nut or axle nut according to claim 4, wherein the printed-circuit board extends as a base plate into the inside of the recess.

6. The wheel nut or axle nut according to claim 4, wherein the printed-circuit board is constructed as a circular shaped or ring-segment-shaped base plate.

7. The wheel nut or axle nut according to claim 3, wherein the transmission unit is arranged within the recess together with the sensor element and/or a battery.

8. The wheel nut or axle nut according to claim 1, wherein an antenna is arranged outside the recess.

9. The wheel nut or axle nut according to claim 1, wherein the sensor element is a pressure sensor or force sensor serving to detect the pressure and/or torsion stresses which are produced in the body of the nut or the pressure plate when tightening the nut.

10. The wheel nut or axle nut according to claim 1, wherein the sensor element is a position sensor, with which relative displacements of the sensor element are detectable relative to a reference position.

11. A control device for a wheel nut or an axle nut in vehicles which have at least one wheel bearing which is fixed to a vehicle axle by means of an axle nut and/or at least one vehicle wheel which is fixed to a wheel bearing by means of a wheel nut and which are provided with an on-board electronic system, via which information from sensor elements are displayable for the vehicle driver, wherein the wheel nut and/or the axle nut are provided with a nut body, a central threaded hole, a peripheral wall, an abutment face at a lower side of the nut and a plurality of wrench faces at the peripheral wall of the nut body for tightening or releasing the nut by means of a tool which cooperates with the wrench faces, wherein the wheel nut and/or the axle nut or a washer cooperating therewith has at least one recess therein in which a sensor element is arranged, wherein the sensor element is connected to a wireless interface which is configured to transmit a sensor signal of the sensor element wirelessly to an external reception unit which is connected to the on-board electronic system, wherein there is arranged at a lower side of the nut body a movable pressure plate which is configured to be retained in a non-releasable manner on the nut body but which is configured to rotate relative to the nut body about an axis of the hole, wherein the pressure plate forms, in a fixed state in a direction towards a wheel disc of a vehicle wheel, a collar which widens in an outward direction and which forms with a lower side thereof an abutment face at an outer face of the wheel disc of the vehicle wheel which is fixed with the wheel nut or axle nut, to a hub and cooperates therewith, wherein the lower side of the nut body and an upper side of the pressure plate form friction faces, substantially only the nut body generally being rotated when the wheel nut or axle nut is tightened, in order to comply with a tightening torque, whereas the pressure plate remains fixed in position, wherein the wireless interface is arranged on a ring-segment-like base plate which extends at both sides of the recess, within which the sensor element is arranged, and wherein the segment-like base plate directly adjoins an outer periphery of a cylindrical portion of the pressure plate.

12. The control device according to claim 11, wherein the sensor element is arranged in the recess together with a casting compound or an adhesive, wherein the casting compound or the adhesive preferably completely fills the recess around the sensor element.

13. The control device according to claim 11, wherein the wireless interface has a transmission unit which is connected to the sensor element.

14. The control device according to claim 13, wherein the transmission unit is arranged outside the recess and is electrically connected to the sensor element via a printed-circuit board or wiring.

15. The control device according to claim 14, wherein the printed-circuit board extends as a base plate into the inside of the recess.

16. The control device according to claim 14, wherein the printed-circuit board is constructed as a circular shaped or ring-segment-shaped base plate.

17. The control device according to claim 13, wherein the transmission unit is arranged within the recess together with the sensor element and/or a battery.

18. The control device according to claim 11, wherein an antenna is arranged outside the recess.

19. The control device according to claim 11, wherein the sensor element is a pressure sensor or force sensor serving to detect the pressure and/or torsion stresses which are produced in the body of the nut or the pressure plate when tightening the nut.

20. The control device according to claim 11, wherein the sensor element is a position sensor, with which relative displacements of the sensor element are detectable relative to a reference position.

* * * * *